United States Patent
Simmon

[15] 3,683,549
[45] Aug. 15, 1972

[54] FLOWERPOT

[72] Inventor: Gerhard Simmon, Waitzstr. 18, 2000 Hamburg 52, Germany

[22] Filed: March 17, 1970

[21] Appl. No.: 20,375

[52] U.S. Cl. ..................47/34, 220/23.4, 220/97 C
[51] Int. Cl. ..........................................A01g 9/02
[58] Field of Search................220/97 C, 23.4, 23.6; 206/65 R, 65 K; 47/34, 34.13; 46/25

[56] References Cited

UNITED STATES PATENTS

| | | | |
|---|---|---|---|
| 1,971,075 | 8/1934 | Lockwood | 47/34 |
| 3,123,273 | 3/1964 | Miller | 47/41 UX |
| 2,219,870 | 10/1940 | Jacobus | 47/34 |
| 2,799,972 | 7/1957 | Teixeira | 47/34 |

FOREIGN PATENTS OR APPLICATIONS 1,242,746   8/1960   France..........................46/25

Primary Examiner—Robert E. Bagwill
Attorney—Deszoe Steinherz

[57] ABSTRACT

A flowerpot having protrusion means and recess means in each of the sides of an angular, upper marginal portion. The protrusion means and recess means on each side are mirror-inverted symmetrical to the vertical center line of the respective side for engaging like protrusion means and recess means in an adjacent flowerpot. Downwardly tapering wall means extend from the upper marginal portion to the base of the pot.

4 Claims, 5 Drawing Figures

Patented Aug. 15, 1972  3,683,549

FLOWERPOT

BACKGROUND OF THE INVENTION

The invention relates to an entirely or partly rectangular or hexagonal flowerpot with a continuous upper marginal portion or ledge for close group arrangement, particularly intended for breeding purposes. Such wellknown flowerpots, as compared with entirely round pots, have the distinction of allowing close arrangement. Apart from the utilization of space, however, good stability is also required. It is true that rectangular or hexagonal flowerpots in close arrangement provide better mutual support than round pots, but nevertheless their stability leaves something to be desired.

Stability depends on ratio of base width (or diameter in case of a round base) to height of the pot. It grows with the base, i.e. with the width of the pot in its base region. Such a pot with a wide base requires, however, a greater amount of expensive garden mould than a pot that tapers off in accordance with the form of the plant ball. Moreover, pots with a wide upper section and substantial conicity are frequently in demand in order to make sure that the plants find ample space for broad development above the garden mould, and, on the other hand, the pot volume and the shape of the pot correspond to the actual requirements of the root ball. If good stability is required, this demand cannot be met with the wellknown pots and neither can the demand for as little use of mould as possible.

SUMMARY OF THE INVENTION

The basic idea of the invention is the development of a flowerpot of the type as aforedescribed, which, in group arrangement, offers good stability even without a wide base.

According to the invention, the solution is that each side of the ledge is provided with protrusions and the same number of correspondingly negative recesses, the mutual arrangement of protrusions and recesses being similar on all sides, and on each side mirror-inverted symmetrical to the vertical axis of such side.

In the event of close arrangement of the rectangular, square of hexagonal pots, provided that they are of the same size, the protrusions of one pot fit into the opposite recesses of the neighboring pot, thus offering the desired mutual support and consequently improved stability.

There are, of course, (cf. German registered design 1 857 288) flowerpots with alternately negative and positive fastening means on their edges that may be connected with neighboring pots, but these fastening means consist of horizontally protruding tongues on the sides, the positive tongues being equipped with a snap-button extension which may be pressed into the suiting bore of the negative opening. This connecting device is practically useless because, firstly, its production costs are too high, secondly, too much space remains unexploited between the pots, and thirdly, handling is too complicated because, when arranging the pots, care must be taken that each positive fastening means faces a negative one, and after that the fastening means have to be connected by pressing them together in snap-fastener manner. The fastening devices interfere also with the disconnecting of the pots.

In contrast to those pots, the arranging of the pots as presented by the invention requires no special care at all, because each side of the pot fits any other side of a pot, so that each pot fits the arrangement of the other pots in any possible position. The protrusions and recesses even fit automatically into each other, when the pots are being arranged closely, so that the closing of the mutual connections does not require any attentive care either. In the same way as has hitherto been the case with the known pots described at the beginning, the pots can be arranged closely in an easy manner; the desired connection and support results automatically. In the same way the pots can be disconnected without difficulty. According to the invention the protrusions and recesses are formed in such a way that their surfaces offer elements with a considerable horizontal directional component because these surface elements of the protrusions and recesses support each other and likewise offer supporting resistance to a vertical relative movement caused by neighboring pots. Such a vertical relative movement would also occur in the event of a collective tipping movement in one direction by neighboring pots, so that this characteristic feature of the invention, too, guarantees increased stability. That the surface elements have a considerable horizontal directional component in the sense of the invention is proved by the fact that they create the supporting resistance to the vertical relative movement mentioned above. Even an inclination of only 30° from the vertical axis, or even less, in this sense may develop an adequate horizontal directional component.

The flowerpot as presented by the invention should suitably be produced from thermoplastic material, preferably by a deep-drawing process. The protrusions and recesses may easily be worked into the material during the drawing process, or afterwards. Owing to the mutual support lent by the pots they may be highly conical and taper off similar to the shape of a funnel which, apart from the saving of expensive garden mould, also guarantees a better retention of water. Frequently, particularly in the case of dried-up mould, a crack develops between the garden mould with the root ball, and the inner pot wall, where the water will quickly run down in the case of a steep wall, without sufficiently soaking the ball. The conicity intended by the invention avoids, or at least reduces the development of such cracks. To further improve water retention or the soaking of the contents of the pot in accordance with a further characteristic feature of the invention, the pot inside walls can be provided with steps, the step surfaces advantageously ascending to the interior of the pot, e.g., at an angle of 10°–15° against the horizontal line. This is a safe measure against the development of a top-to-base crack between the contents of the pot and its inner wall, and the water flowing down any crack will be forced into the direction toward the root ball.

When, at the beginning, it was stated that the pot should have a rectangular or hexagonal shape, this fact mainly concerned the shape of the upper edge or ledge. The part of the pot that tapers off beneath the upper edge or ledge may have a round or, in continuation of the ledge, angular cross section, the angular shape recommending itself since in this case the base will further improve stability. The protrusions and recesses should be preferably arranged in such a way that the pots can be stacked easily. This can be done, for example, by letting the ledge protrude from the main body of the pot by a certain length which roughly corresponds to the depth of the recesses.

The recesses can also be replaced by openings, the edges of the openings fitting the similarly shaped lower and, if need be, upper parts of the protrusions on the sides.

Apart from the advantages mentioned above, the pot as presented by the invention has all the wellknown advantages of pots that fit without any gaps. In addition, it should especially be mentioned that the closely arranged pots as presented by the invention have such a stability that they can be collectively filled with garden mould and, thus, need not be filled individually. The increased conicity, made possible by the invention, results in increased space between the lower parts of the pots, such space being closed towards its top by means of the pot edges, thus allowing easy supply of the pots with heat from below.

On the basis of advantageous design examples, the invention is described hereinafter in detail with reference to the drawings in which

DETAILED DESCRIPTION OF PREFERRED EMBODIMENT

Figure 1:
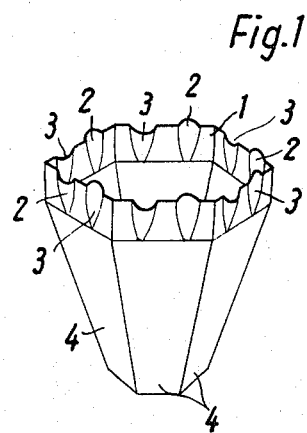
FIG. 1 shows a hexagonal pot with one protrusion and recess on each side of the upper edge portion or ledge.
Figure 2:
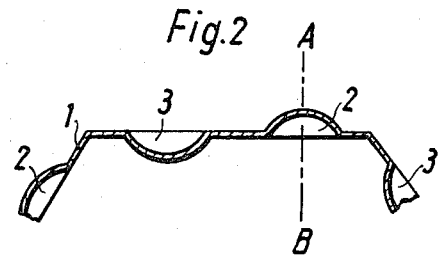
FIG. 2 is an enlarged fragmentary topview of a ledge portion according to FIG. 1.
Figure 4:
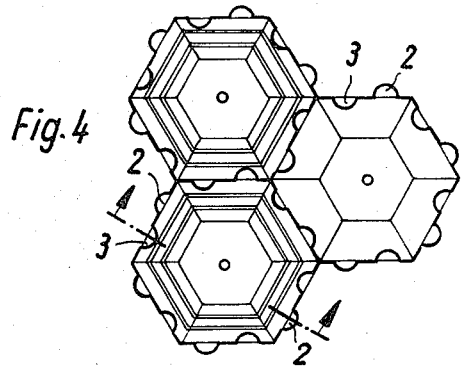
FIG. 4 is a topview of closely arranged pots of the type shown in FIGS. 1 to 3.
Figure 3:
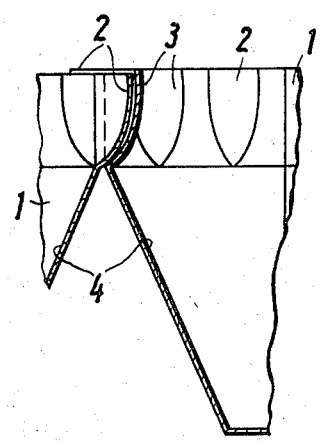
FIG. 3 is a sectional view of the contact area of two neighboring pots in the area of a protrusion and recess the section being taken as generally indicated at one of the protrusions by line AB in FIG. 2.

Each pot consists of one continuous upper edge or marginal portion or ledge 1 with external protrusions 2 and recesses 3, sidewalls 4 of the body and a base. The protrusions and recesses are inversely similar and shaped in such a way that they fit each other so that the lateral and lower surface elements interact in order to prevent the neighboring pots from making lateral or vertical relative movements. In the examples given they have the form of protrusions and recesses with a curved cross section and which on all sides taper off towards the bottom. FIG. 4 shows that the protrusions and recesses of the pots always fit into each other, when the pots are arranged closely, irrespective of sides fitted. This is achieved by the fact that each side is inversely similar to the side that it faces, the recesses flaring outwardly and the protrusions having a complementary shape as shown in the drawings. Preferably, the lateral parts of the protrusions or recesses should be inclined towards the respective side of the ledge to only such a degree that a pot may be placed without pressure in the angle formed by two pots that have already been arranged. This inclination is 45° in the case of rectangular pots and 60° in the case of hexagonal pots. The wider such angle, the safer the support created by neighboring pots. The inclination should, however, not be too wide in order to allow easy arranging of the pots. The same holds true for the lower and, if need be, upper parts of the protrusions and recesses about which it was stated above that it would be of advantage, if they have a considerable horizontal directional component. The lower and upper parts, indeed, do not have a critical angle that may not be exceeded, which may be done in the lateral parts, so that even an inclination of 90° towards the surface of the respective ledge may seem possible, but for reasons of profiling and easy handling an inclination of approximately 45°-60° is recommended as can be seen in FIG. 3.

The examples shown in the drawings demonstrate that the sidewalls forming the body may taper off considerably in order to form a relatively small base. This does not jeopardize the stability of the pots owing to the ledge support as presented by the invention. As shown in the drawings, the sidewalls may form a body of inverted, generally frustoconical shape.

Figure 5:
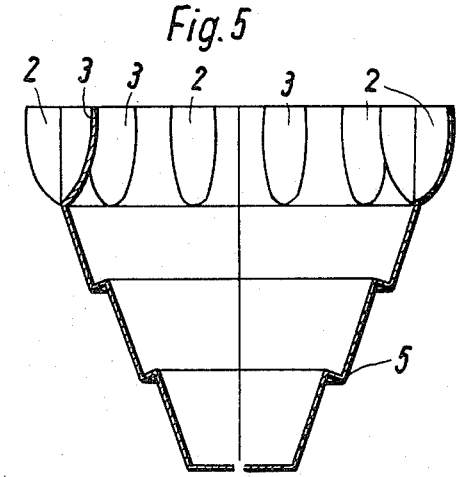
FIG. 5 is a longitudinal section of a modified flowerpot according to the invention.

FIG. 5 shows an example in which the sidewalls have continuous internal steps 5, the surfaces of which ascend towards the interior of the pot.

What is claimed is:

1. A flowerpot adapted for close group arrangement and suitable for breeding purposes and the like, comprising a continuous angular, upper marginal portion having a plurality of generally vertical sides, each of said sides having a substantially vertical center line; downwardly tapering wall means connected to said upper marginal portion; and a base connected to said wall means each of said sides of the upper marginal portion being provided with means forming a protrusion convexly flared toward the pot exterior in a vertical plane cross-section of the pot cut through the protrusion and with means forming a recess concavely flared toward the pot exterior in a vertical plane cross section of the pot through said recess and corresponding in form to said protrusion forming means, the corresponding shapes of recess and protrusion being such that when two such pots are nested the recess of one pot provides a resistance to tilting of the adjacent pot whose corresponding protrusion is nested therein, the arrangement of said protrusion and recess being on all of said sides identical and on each of said sides mirror-inverted symmetrical to said center line of the respective side so that when two such pots are nested in side by side contact at any of their respective walls a bilateral tilting resistance is afforded at their respective upper marginal portions.

2. A flowerpot as defined in claim 1, which consists of uniform thin-section plastic material.

3. A flowerpot as defined in claim 2, wherein said wall means has at least one step therein, and said step includes at least one internal surface ascending towards the interior of said flowerpot.

4. A flowerpot adapted for close group arrangement in abutting relationship with adjacent, substantially identical flowerpots and suitable for breeding purposes and the like, comprising a continuous angular, upper marginal portion having a plurality of generally vertical sides, each of said sides having a substantially vertical center line; wall means connected to said upper marginal portion and generally having an inverted frustoconical shape; and a base connected to said wall means; each of said sides of the upper marginal portion being provided with means forming a protrusion convexly flared toward the pot exterior in a verticle plane cross-section of the pot cut through the protrusion and with means forming a recess concavely flared toward the pot exterior in a vertical plane cross-section of the pot through said recess and corresponding in form to said protrusion forming means, the corresponding shapes of recess and protrusion being such that when two such pots are nested the recess of one pot provides a resistance to tilting of the adjacent pot whose corresponding protrusion is nested therein, the arrangement of said protruding means and recess means being on all of said sides identical and on each of said sides mirror-inverted symmetrical to said center line of the respective side so that when two such pots are nested in side by side contact at any of their respective walls a bilateral tilting resistance is afforded at their respective upper marginal portions; each of said protruding means and recess means being shaped so that said first-mentioned flowerpot may be engaged with, and disengaged from, any one of said adjacent flowerpots by laterally moving said first-mentioned flowerpot and said one of the adjacent flowerpots relative to each other substantially horizontally.

* * * * *